United States Patent
Wang et al.

(10) Patent No.: US 7,623,277 B2
(45) Date of Patent: Nov. 24, 2009

(54) DUPLEX SCANNING APPARATUS

(75) Inventors: Chung-Kai Wang, Taipei (TW);
Chien-Kuo Kuan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 12/199,311

(22) Filed: Aug. 27, 2008

(65) Prior Publication Data
US 2009/0219495 A1 Sep. 3, 2009

(30) Foreign Application Priority Data
Feb. 29, 2008 (TW) .............................. 97106976 A

(51) Int. Cl.
*H04N 1/04* (2006.01)
*G03G 15/00* (2006.01)
*B65H 85/00* (2006.01)

(52) U.S. Cl. .................. 358/498; 358/496; 399/367; 399/368; 399/374; 399/364; 399/373; 271/225; 271/186

(58) Field of Classification Search .................. 358/498, 358/496, 401; 399/367, 368, 374, 364, 373; 355/23, 24; 271/225, 186; 382/318, 319
See application file for complete search history.

(56) References Cited

U.S. PATENT DOCUMENTS

| | | | | |
|---|---|---|---|---|
| 5,991,592 A * | 11/1999 | Kobayashi et al. | .......... | 399/374 |
| 6,161,831 A * | 12/2000 | Kusakabe et al. | .......... | 271/186 |
| 6,209,861 B1 * | 4/2001 | Kakuta et al. | .......... | 271/3.02 |
| 6,393,251 B2 * | 5/2002 | Kono | .......... | 399/370 |
| 6,522,860 B2 * | 2/2003 | Nose et al. | .......... | 399/374 |
| 6,529,259 B1 * | 3/2003 | Kono | .......... | 355/23 |
| 6,970,272 B2 * | 11/2005 | Nanno | .......... | 358/1.9 |
| 7,339,654 B2 * | 3/2008 | Mizubata et al. | .......... | 355/407 |
| 7,394,580 B2 * | 7/2008 | Ohsawa | .......... | 358/498 |
| 7,533,882 B2 * | 5/2009 | Song | .......... | 271/186 |
| 2007/0003344 A1 * | 1/2007 | Lee et al. | .......... | 399/374 |
| 2008/0062477 A1 * | 3/2008 | Jo | .......... | 358/498 |
| 2009/0086287 A1 * | 4/2009 | Won | .......... | 358/498 |

* cited by examiner

*Primary Examiner*—Cheukfan Lee
(74) *Attorney, Agent, or Firm*—Kirton & McConkie; Evan R. Witt

(57) ABSTRACT

The present invention relates to a duplex scanning apparatus. The duplex scanning apparatus includes a scanning module, a sheet input tray, a sheet ejecting tray, a transfer channel, a sheet pick-up roller, a friction-enhancing stopper, a transfer roller assembly, a sensor, a first inverting region, a second inverting region, an inverting channel, a sheet ejecting roller assembly, a first inverting roller assembly, a second inverting roller assembly, a first switching element and a second switching element. By providing two inverting regions, the scanning time for performing a duplex scanning operation by the duplex scanning apparatus of the present invention is shortened.

11 Claims, 4 Drawing Sheets

DUPLEX SCANNING APPARATUS

FIELD OF THE INVENTION

The present invention relates to a duplex scanning apparatus, and more particularly to a duplex scanning apparatus for performing a two-pass scanning operation.

BACKGROUND OF THE INVENTION

Image scanners are widely used for scanning images of documents, photographs or films. The scanned images can be converted into electronic files, which are then stored, processed or spread. With increasing development of scanning technologies, the image scanners have experienced great growth and are now rapidly gaining in popularity.

In the early stage, the image scanner can scan one side of the document. For scanning both sides of the document, after one side of the document has been scanned, the document should be manually turned over so as to scan the other side of the document. However, the process of manually turning over the document is troublesome. Recently, a duplex scanning apparatus has been developed for automatically performing a duplex scanning operation to scan both sides of the document.

A typical duplex scanning apparatus usually comprises a flatbed image scanning portion and an automatic document feeder arranged above the flatbed image scanning portion. The flatbed image scanner portion is utilized to scan most documents regardless of a single sheet or a thick book. In a case that the thick book is scanned, the automatic document feeder is not feasible. For performing the duplex scanning operation, a stack of paper sheets are successively and continuously fed by the automatic document feeder to be transported through a scan region in the flatbed image scanning portion. For most duplex scanning apparatuses, the flatbed image scanning portion has one scanning module responsible for scanning both sides of the document. After scanned, the paper sheets are exited to the sheet ejecting tray.

Generally, for performing the duplex scanning operation by the duplex scanning apparatus having one scanning module while rearranging the scanned documents in the same order as the original stack, the documents need to be transported across the scan region for three times. Therefore, such a duplex scanning operation is referred as a three-pass scanning operation. When the document is transported across the scan region for the first time, the scanning module scans a first side of the document. When the document is transported across the scan region for the second time, the scanning module scans a second side of the document. Finally, the document is transported across the scan region for the third time to rearrange each document into the same order as the original stack but the scanning module does not scan the document. The three-pass scanning operation of the duplex scanning apparatus, however, is relatively time-consuming. For increasing the scanning speed, a duplex scanning apparatus for performing a two-pass scanning operation has been developed. In the two-pass scanning operation, the documents need to be transported across the scan region for two times.

For example, U.S. Pat. No. 6,648,320 (also referred hereinafter as '320 patent) discloses a duplex scanning apparatus for performing a two-pass scanning operation while rearranging the scanned documents in the same order as the original stack. FIG. 1 is a schematic cross-sectional view illustrating a duplex scanning apparatus according to a first embodiment of the '320 patent. The duplex scanning apparatus 100 of the '320 patent includes a flatbed image scanning portion 101 and an automatic document feeder 113. The flatbed image scanning portion 101 includes a light source 116, several reflective mirrors 117, a lens 118 and an image receiving element 119. The automatic document feeder 113 includes a sheet input tray 102, a first sheet ejecting tray 1031, a second sheet ejecting tray 1032, a sheet pick-up roller 112, a first transfer channel 104, a second transfer channel 106, a third transfer channel 105, a first ejecting channel 108, a second ejecting channel 109, a first inverting channel 110, a second inverting channel 107, a first switching element 121, a second switching element 122, a third switching element 123, a fourth switching element 124, a scan region 115, a first inverting region 120, a second inverting region 111, a first inverting roller assembly 125 and a second inverting roller assembly 114.

Please refer to FIG. 1 again. Hereinafter, a procedure of performing a single-side scanning operation by the duplex scanning apparatus 100 according to the '320 patent is illustrated. First of all, multiple documents (not shown) to be scanned are placed on the sheet input tray 102. Then, the sheet pick-up roller 112 transports a first document into the first transfer channel 104. Then, the roller assembly beside the first transfer channel 104 transports the document into the second transfer channel 106. When the document is transported across the scan region 115, the light beams emitted from the light source 116 of the flatbed image scanning portion 110 are projected on the documents and reflected by the reflective mirrors 117. The reflected light beams are focused by the lens 118 onto the image receiving element 119. After receiving the focused light beams, the image receiving element 119 outputs corresponding image signals to a computer which is linked to the duplex scanning apparatus 100. After the document has been scanned, the first switching element 121 is switched to open the third transfer channel 105 such that the document is transported to the first sheet ejecting tray 1031 through the third transfer channel 105 and the second ejecting channel 109. Alternatively, after the document has been scanned, the first switching element 121 is switched to open the first ejecting channel 108 such that the document is transported to the second sheet ejecting tray 1032 through the first ejecting channel 108.

Hereinafter, a procedure of performing a duplex scanning operation by the duplex scanning apparatus 100 according to the '320 patent is illustrated. First of all, multiple documents (not shown) to be scanned are placed on the sheet input tray 102. Then, the sheet pick-up roller 112 transports the first document into the first transfer channel 104. Then, the document is transported to the scan region 115 through the second transfer channel 106. When the document is transported across the scan region 115, a first side of the document is scanned. After the first side of the document has been scanned, the first switching element 121 and the second switching element 122 are switched to a position leading the document to the first ejecting channel 108. Next, the document is nipped between the rollers of first inverting roller assembly 125 and transported to the first inverting region 120. Until the tail edge of the document is transported across the second switching element 122 and then nipped between the rollers of the first inverting roller assembly 125, the second switching element 122 is switched to open the first inverting channel 110. Meanwhile, the first inverting roller assembly 125 is rotated in a reverse direction to transport the document into the first inverting channel 110. Next, the document is transported to the scan region 115 through the second transfer channel 106 again. When the document is transported across the scan region 115, a second side of the document is scanned. After the second side of the document has been scanned, the first switching element 121 is switched to open the third ejecting channel 105 such that the document is transported to the third ejecting channel 105. Next, the fourth switching element 124 is switched to lead the document to the second inverting region 111. After the tail edge of the document passes through the fourth switching element 124, the fourth switching element 124 is switched to open the second inverting channel 107. Then, the second inverting roller assembly 114 is rotated in a reverse direction to transport the document into the first sheet ejecting tray 1031. Meanwhile, the duplex scanning operation is completed.

As previously described, during a duplex scanning operation of the duplex scanning apparatus 100, the document needs to be transported across the scan region for two times. After the second side of the document has been scanned, the document is led to the second inverting region 111 to be rearranged in the same order as the original stack, instead of being sent to the first sheet ejecting tray 1031 or the second sheet ejecting tray 1032. In comparison with the duplex scanning apparatus performing the three-pass scanning operation, the duplex scanning apparatus 100 of the '320 patent has a higher scanning speed.

The duplex scanning apparatus 100 of the '320 patent, however, still has some drawbacks. For example, due to spatial hindrance, the first sheet ejecting tray 1031 can accommodate relatively small-sized documents. Whereas, the document having a size greater than a special size needs to be ejected to the second sheet ejecting tray 1032. In other words, the document having a size greater than the special size needs to be transported across the scan region 115 for three times in order to rearrange the document in the same order as the original stack. Under this circumstance, the speed of scanning the large-sized document by using the duplex scanning apparatus 100 of the '320 patent is not high enough. Therefore, the '320 patent further disclosed another duplex scanning apparatus for increasing the speed of scanning the large-sized document.

FIG. 2 is a schematic partially cross-sectional view illustrating a duplex scanning apparatus according to a second embodiment of the '320 patent. In the second embodiment of the '320 patent, only one sheet ejecting tray is included and the sheet ejecting roller assembly is modified. Hereinafter, a procedure of performing a duplex scanning operation by the duplex scanning apparatus 200 according to the '320 patent is illustrated with reference to FIG. 2. First of all, a document to be scanned is transported to the scan region 215 through the first transfer channel (not shown) and the second transfer channel 206. When the document is transported across the scan region 215, a first side of the document is scanned. After the first side of the document has been scanned, the first switching element 221 and the second switching element 222 are switched to lead the document to the ejecting channel 208. Next, the document is transported to the first inverting region and nipped between the driving roller 2141 and the follower roller 2142 of the inverting roller assembly 214. Until the tail edge of the document is completely detached from the ejecting channel 208, the second switching element 222 is switched to open the first inverting channel 210. Next, the document is transported to the scan region 215 through the first inverting channel 210 and the second transfer channel 206. When the document is transported across the scan region 215, a second side of the document is scanned. After the second side of the document has been scanned, the first switching element 221 and the third switching element 223 are switched to open the third transfer channel 205 such that the document is transported to the second inverting region 211. Next, the third switching element 223 are switched to open the second inverting channel 207 such that the document is transported to the sheet ejecting tray 203 through the second inverting channel 207. Meanwhile, the duplex scanning operation is completed. Since the sheet ejecting tray 203 can accommodate large-sized documents, the document of diverse sizes can be scanned by the duplex scanning apparatus 200 while the scanned document is transported across the scan region 215 for only two times.

Although the document is transported across the scan region for only two times by the duplex scanning apparatus of the '320 patent, the document is still inverted for two times in order to perform each duplex scanning operation. In other words, since the inversion path is shortened, the duplex scanning operation performed by the duplex scanning apparatus of the '320 patent has increased scanning speed in comparison with the three-pass scanning operation. For further increasing the scanning speed of performing the duplex scanning operation, there is a need of providing for performing a two-pass scanning operation while inverting the document for only one time.

SUMMARY OF THE INVENTION

It is an object of the present invention to provide a duplex scanning apparatus for performing a two-pass scanning operation, in which the scanned documents are stacked in the sheet ejecting tray in the same order as the original stack.

In accordance with an aspect of the present invention, there is provided a duplex scanning apparatus for scanning images of a plurality of documents. The duplex scanning apparatus includes a flatbed image scanning portion and an automatic document feeder. The flatbed image scanning portion includes a scanning module for scanning the images of the documents in a scan region. The automatic document feeder includes a sheet input tray, a sheet ejecting tray, a transfer channel, a sheet pick-up roller, a friction-enhancing stopper, a transfer roller assembly, a first inverting region, a second inverting region, an inverting channel, a first switching element, a second switching element, a sheet ejecting roller assembly, a first inverting roller assembly and a second inverting roller assembly. The sheet input tray is used for placing the documents thereon. The sheet ejecting tray is used for supporting the documents thereon. The transfer channel is arranged between the sheet input tray and the sheet ejecting tray, wherein a portion of the transfer channel is disposed within the range of the scan region. The sheet pick-up roller is disposed in the sheet input tray for transporting the documents into the transfer channel. The friction-enhancing stopper is sustained against the documents to offer a frictional force required to transport the documents into the transfer channel such that only one of the documents is selected to feed into the transfer channel for each time. The transfer roller assembly is disposed in the transfer channel for transporting the documents through the transfer channel. The first inverting region is disposed between the sheet input tray and the sheet ejecting tray. The second inverting region is disposed between the first inverting region and the sheet ejecting tray. The inverting channel is arranged between the inverting regions and the transfer roller assembly. The first switching element is arranged at the intersection between the transfer channel and the sheet ejecting tray for guiding the documents to the sheet ejecting tray or the inverting regions. The second switching element is arranged at the intersection between the inverting channel and the second inverting region for guiding the documents to the first inverting region or the second inverting region. The sheet ejecting roller assembly is disposed in the vicinity of the sheet ejecting tray for transporting the documents to the sheet ejecting tray. The first inverting roller assembly is disposed in the vicinity of the first inverting region for transporting the documents from the transfer channel to the first inverting region or from the first inverting region to the inverting channel. The second inverting roller assembly is disposed in the vicinity of the second inverting region for transporting the documents from the transfer channel to the second inverting region or from the second inverting region to the inverting channel.

In an embodiment, the first inverting roller assembly includes a first driving roller and a first follower roller. The first driving roller is rotated in either a positive direction or a reverse direction.

In an embodiment, the second inverting roller assembly includes a second driving roller and a second follower roller. The second driving roller is rotated in either a positive direction or a reverse direction.

In an embodiment, the first inverting region includes a first thin plate for supporting the documents which are exited to the first inverting region.

In an embodiment, the second inverting region includes a second thin plate for supporting the documents which are exited to the second inverting region.

In an embodiment, the duplex scanning apparatus further includes a sensor, which is arranged between the transfer roller assembly and the scan region and electrically connected to the first switching element and the second switching element, for detecting locations of the documents and controlling the first switching element and the second switching element according the locations of the documents.

In accordance with another aspect of the present invention, there is provided a duplex scanning method for scanning a plurality of documents by a duplex scanning apparatus. The documents are sustained against a sheet pick-up roller. The method includes steps of feeding a first document of the documents which is in direct contact with the sheet pick-up roller into a transfer channel; scanning a second side of the first document when the first document is transported across a scan region; feeding a second document of the documents which is in direct contact with the sheet pick-up roller into the transfer channel when a tail edge of the first document passes through a sensor; feeding the first document into a first inverting region; scanning a second side of the second document when the second document is transported across the scan region; feeding the first document into an inverting channel when a tail edge of the second document passes through the sensor; feeding the second document into a second inverting region; scanning a first side of the first document when the first document is transported across the scan region; ejecting the first document into a sheet ejecting tray; feeding the second document into the scan region and scanning a first side of the second document when the second document is transported across the scan region; and ejecting the first document into the sheet ejecting tray.

In an embodiment, the first inverting roller assembly includes a first driving roller and a first follower roller. The first driving roller is rotated in either a positive direction or a reverse direction.

In an embodiment, the second inverting roller assembly includes a second driving roller and a second follower roller. The second driving roller is rotated in either a positive direction or a reverse direction.

In an embodiment, the first inverting region includes a first thin plate for supporting the documents which are exited to the first inverting region.

In an embodiment, the second inverting region includes a second thin plate for supporting the documents which are exited to the second inverting region.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
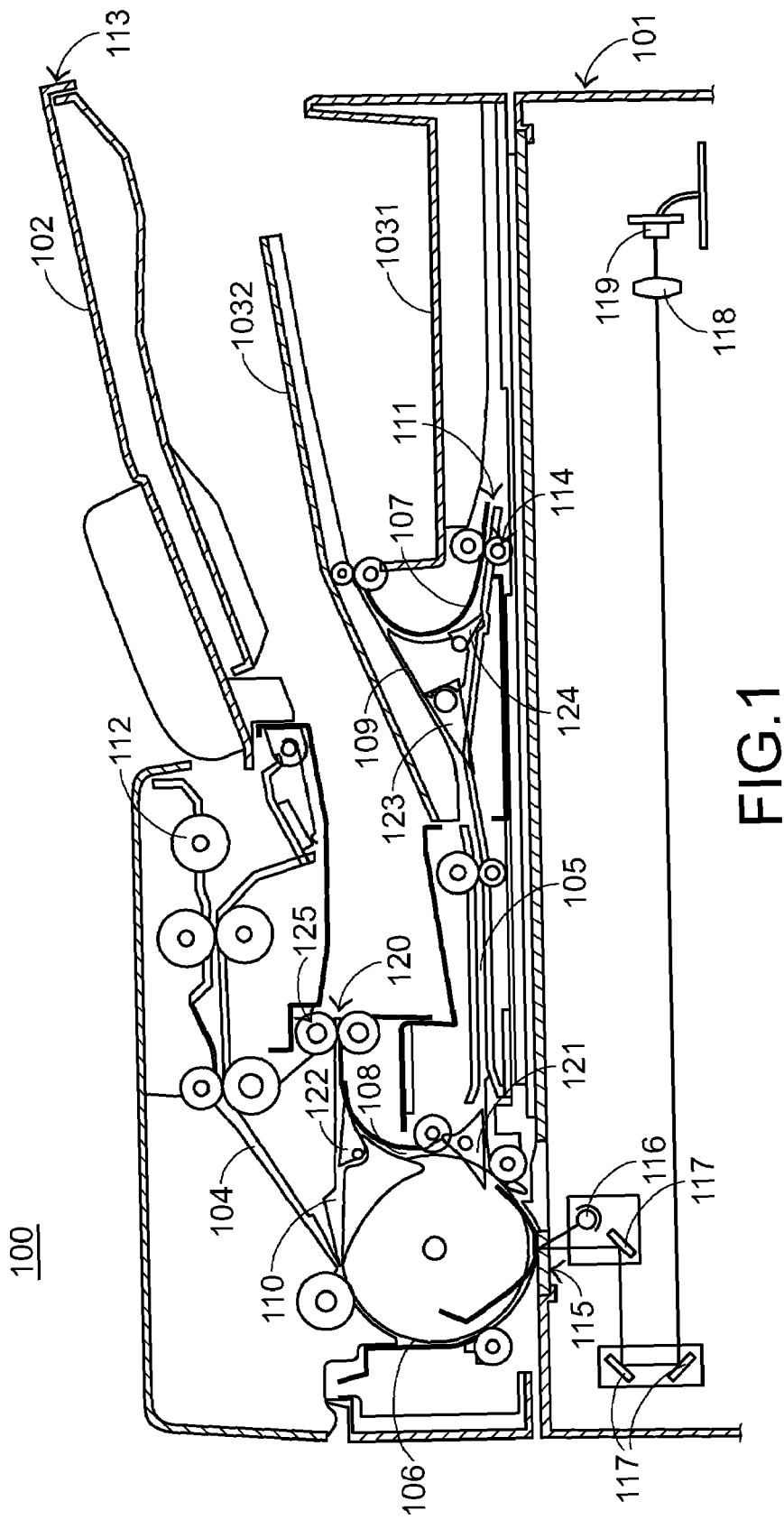
FIG. 1 is a schematic cross-sectional view illustrating a duplex scanning apparatus according to a first embodiment of U.S. Pat. No. 6,648,320.
Figure 2:
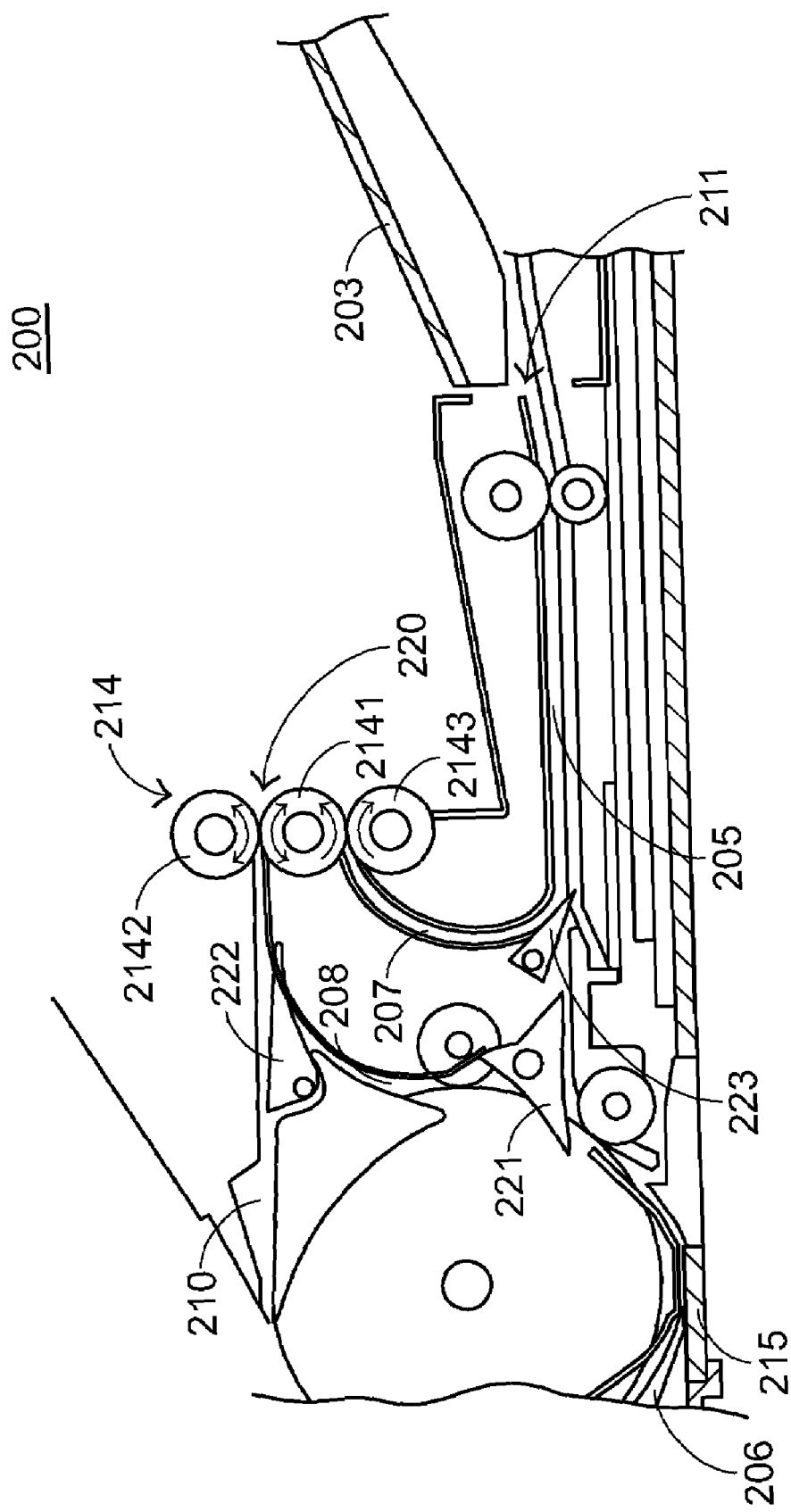
FIG. 2 is a schematic cross-sectional view illustrating a duplex scanning apparatus according to a second embodiment of U.S. Pat. No. 6,648,320.
Figure 3:
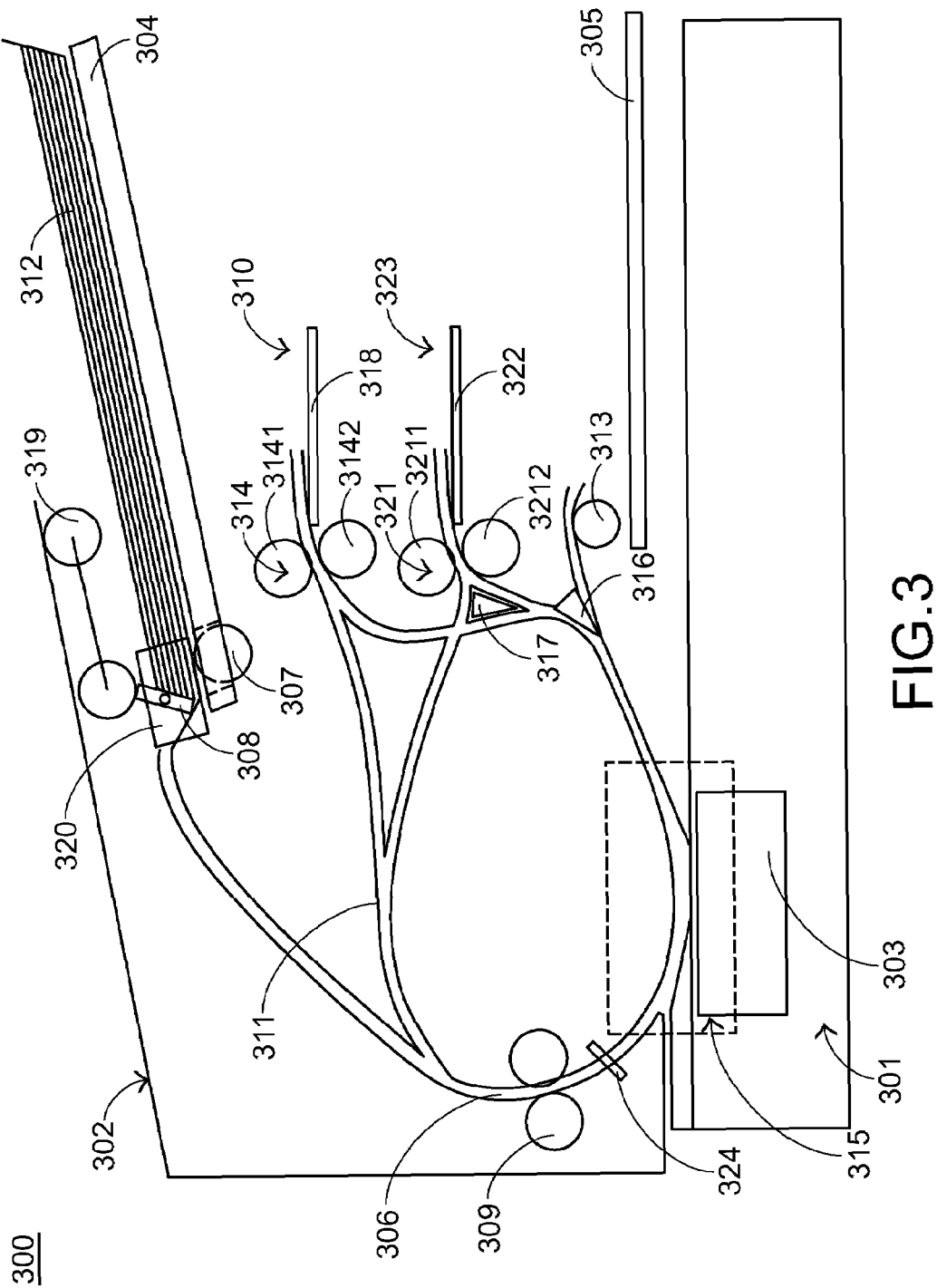
FIG. 3 is a schematic cross-sectional view illustrating a duplex scanning apparatus for performing a duplex scanning operation according to a preferred embodiment of the present invention.

FIG. 3 is a schematic cross-sectional view illustrating a duplex scanning apparatus for performing a duplex scanning operation according to a preferred embodiment of the present invention. The duplex scanning apparatus 300 as shown in FIG. 3 comprises a flatbed image scanning portion 301 and an automatic document feeder 302. The flatbed image scanning portion 301 has one scanning module 303 for scanning images of a document 312 when the document 312 is transported across a scan region 315. The automatic document feeder 302 includes a sheet input tray 304, a sheet ejecting tray 305, a transfer channel 306, a sheet pick-up roller 307, a friction-enhancing stopper 308, a transfer roller assembly 309, a sensor 324, a first inverting region 310, a second inverting region 323, an inverting channel 311, a sheet ejecting roller assembly 313, a first inverting roller assembly 314, a second inverting roller assembly 321, a first switching element 316 and a second switching element 317.

The documents 312 to be scanned are placed on the sheet input tray 304 of the automatic document feeder 302. The sheet input tray 304 is higher than that of the sheet ejecting tray 305 with respect to the horizon. That is, the sheet input tray 304 is disposed above the sheet ejecting tray 305. The scanned documents 312 are exited to the sheet ejecting tray 305. The transfer channel 306 is arranged between the sheet input tray 304 and the sheet ejecting tray 305. A portion of the transfer channel 306 is disposed within the range of the scan region 315. The transfer roller assembly 309 is disposed in the transfer channel 306 for transporting the documents 312. When one document 312 is transported through the transfer channel 306 and across the scan region 315, the scanning module 303 scans the document 312. The sheet pick-up roller 307 is disposed in the sheet input tray 304. The friction-enhancing stopper 308 is disposed above the sheet input tray 304 and cooperated with the sheet pick-up roller 307 to feed the document 312 from the sheet input tray 304 into the transfer channel 306. In the vertical direction, the first inverting region 310 is higher than the sheet ejecting tray 305 but lower than the sheet input tray 304. The first inverting region 310 includes a first thin plate 318, which is disposed in the vicinity of the first inverting roller assembly 314. The first inverting roller assembly 314 includes a first driving roller 3141 and a second follower roller 3142. The second inverting region 323 is higher than the sheet ejecting tray 305 but lower than the first inverting region 310. The second inverting region 323 includes a second thin plate 322, which is disposed in the vicinity of the second inverting roller assembly 321. The second inverting roller assembly 321 includes a second driving roller 3211 and a second follower roller 3212. The inverting channel 311 is arranged between the first inverting region 310 and the transfer roller assembly 309. By changing the rotational direction of the first inverting roller assembly 314, the document 312 is either exited to the first inverting region 310 or transported into the inverting channel 311. Similarly, by changing the rotational direction of the second inverting roller assembly 321, the document 312 is either exited to the second inverting region 323 or transported into the inverting channel 311. The sensor 324 is arranged between the transfer roller assembly 309 and the scanning module 303. The sensor 324 is electrically connected to the first switching element 316 and the second switching element 317. The first switching element 316 is arranged at the intersection between the transfer channel 306 and the sheet ejecting tray 305. The second switching element 317 is arranged at the intersection between the inverting channel 311 and the second inverting region 323. The sheet ejecting roller assembly 313 is disposed beside the sheet ejecting tray 305 for transporting the document 312 to the sheet ejecting tray 305.

Please refer to FIG. 3 again. Hereinafter, the procedure of performing a duplex scanning operation by the duplex scanning apparatus 300 is illustrated. First of all, a stack of documents 312 to be scanned are placed on the sheet input tray 304, wherein the first sides of the documents 312 face downwardly. Due to the weight of the documents 312, the documents 312 are downwardly sustained against the sheet pick-up roller 307. In addition, the front edges of the stack of documents 312 are sustained against the friction-enhancing stopper 308. The sheet pick-up roller 307 is cooperated with the friction-enhancing stopper 308 to offer a frictional force required to transport the document 312. That is, the friction-enhancing stopper 308 functions as a sheet separation roller such that only a single document 312 in direct contact with the sheet pick-up roller 307 and the friction-enhancing stopper 308 is separated from the stack of documents 312 and allowed to be fed into the transfer channel 306 for each time. In this embodiment, the bottommost document (i.e. a first document) which is contacted with the sheet pick-up roller 307 is fed into the transfer channel 306. After the first document is fed into the transfer channel 306, the transfer roller assembly 309 transports the document to the scan region 315. When the first document is transported across the sensor 324 between the transfer roller assembly 309 and the scan region 315, the sensor 324 is triggered to control the first switching element 316 to close the path leading to the sheet ejecting tray 305 and control the second switching element 317 to close the path leading to the second inverting region 323. That is, under control of the sensor 324, the path to the first inverting region 310 is opened. Next, the first document is transported across the scan region 315 and the scanning module 303 of the flatbed image scanning portion 301 scan a second side of the first document. During the scanning process and after the tail edge of the first document passes through the sensor 324, it is meant that the first document has completely passed through the sensor 324. Meanwhile, the next bottommost document (i.e. a second document) on the sheet input tray 304 is fed by the sheet pick-up roller 307 into the transfer channel 306. After the first document has been scanned, the first document can be smoothly transported by the first inverting roller assembly 314 to the first inverting region 310, in which the first driving roller 3141 of the first inverting roller assembly 314 is rotated in a positive direction. Until the majority of the first document is supported on the first thin plate 318 of the first inverting region 310, the scanning operation on the second side of the first document is completed.

On the other hand, the second document fed into the transfer channel 306 is transported by the transfer roller assembly 309. Until the second document is detected by the sensor 324, the sensor 324 is triggered to control the first switching element 316 and the second switching element 317 to open the path leading to the second inverting region 323. Next, the second document is transported across the scan region 315 and the scanning module 303 of the flatbed image scanning portion 301 scan a second side of the second document. During the scanning process and after the tail edge of the second document passes through the sensor 324, the first driving roller 3141 of the first inverting roller assembly 314 is rotated in a reverse direction. Therefore, the first driving roller 3141 and the first follower roller 3142 are cooperated to feed the first document from the first inverting region 310 into the inverting channel 311. Moreover, until the majority of the second document is supported on the second thin plate 322 of the second inverting region 323, the scanning operation on the second side of the second document is completed.

Next, the first document fed into the inverting channel 311 is transported by the transfer roller assembly 309. Until the first document is detected by the sensor 324, the sensor 324 is triggered to control the first switching element 316 to open the path leading to the sheet ejecting tray 305. At this moment, the second switching element 317 is maintained at the position to open the path leading to the inverting channel 311. Next, the first document is transported across the scan region 315 and the scanning module 303 of the flatbed image scanning portion 301 scan the first side of the first document. After the first side of the first document has been scanned, the front edge of first document starts to be ejected to the sheet ejecting tray 305. Until the tail edge of the first document passes through the sensor 324, the second driving roller 3211 of the second inverting roller assembly 321 is rotated in a reverse direction. Therefore, the second driving roller 3211 and the second follower roller 3212 are cooperated to feed the second document from the second inverting region 323 into the inverting channel 311. Until the first document is completely ejected to the sheet ejecting tray 305, the scanning operation on the first side of the first document is completed. Meanwhile, the duplex scanning operation on the first document is completed. Next, the second document is transported into the transfer channel 306 through the inverting channel 311. When the second document is transported across the sensor 324, the sensor 324 is not triggered such that the first switching element 316 maintains changed. When the second document is transported across the scan region 315, the scanning module 303 of the flatbed image scanning portion 301 scan the first side of the second document. After the first side of the second document has been scanned, the second document starts to be ejected to the sheet ejecting tray 305. Meanwhile, the duplex scanning operation on the second document is completed. By using the duplex scanning apparatus 300, the first sides of the first document and the second document on the sheet ejecting tray 305 face downwardly. As a consequence, the documents 312 after scanned by the duplex scanning operations are stacked on the sheet ejecting tray 305 in the same order as the original stack.

Especially, during the first side of the second document is scanned and the tail edge of the second document passes through the sensor 324, Meanwhile, the next bottommost document (i.e. a third document) on the sheet input tray 304 is fed by the sheet pick-up roller 307 into the transfer channel 306. The remainder documents 312 on the sheet input tray 304 successively implement the duplex scanning operations as described above for the first and second documents, and are not redundantly described herein.

Please refer to FIG. 3 again. The duplex scanning apparatus 300 further includes a single-side scanning pick-up arm 319 and a friction-enhancing stopper adjusting unit 320. The friction-enhancing stopper adjusting unit 320 is used to change the inclined angle of the friction-enhancing stopper 308, as can be seen in FIG. 3. For implementing a single-side scanning operation, the inclined angle of the friction-enhancing stopper 308 is changed such that the documents 312 are in direct contact with the single-side scanning pick-up arm 319 and the friction-enhancing stopper 308.

Figure 4:
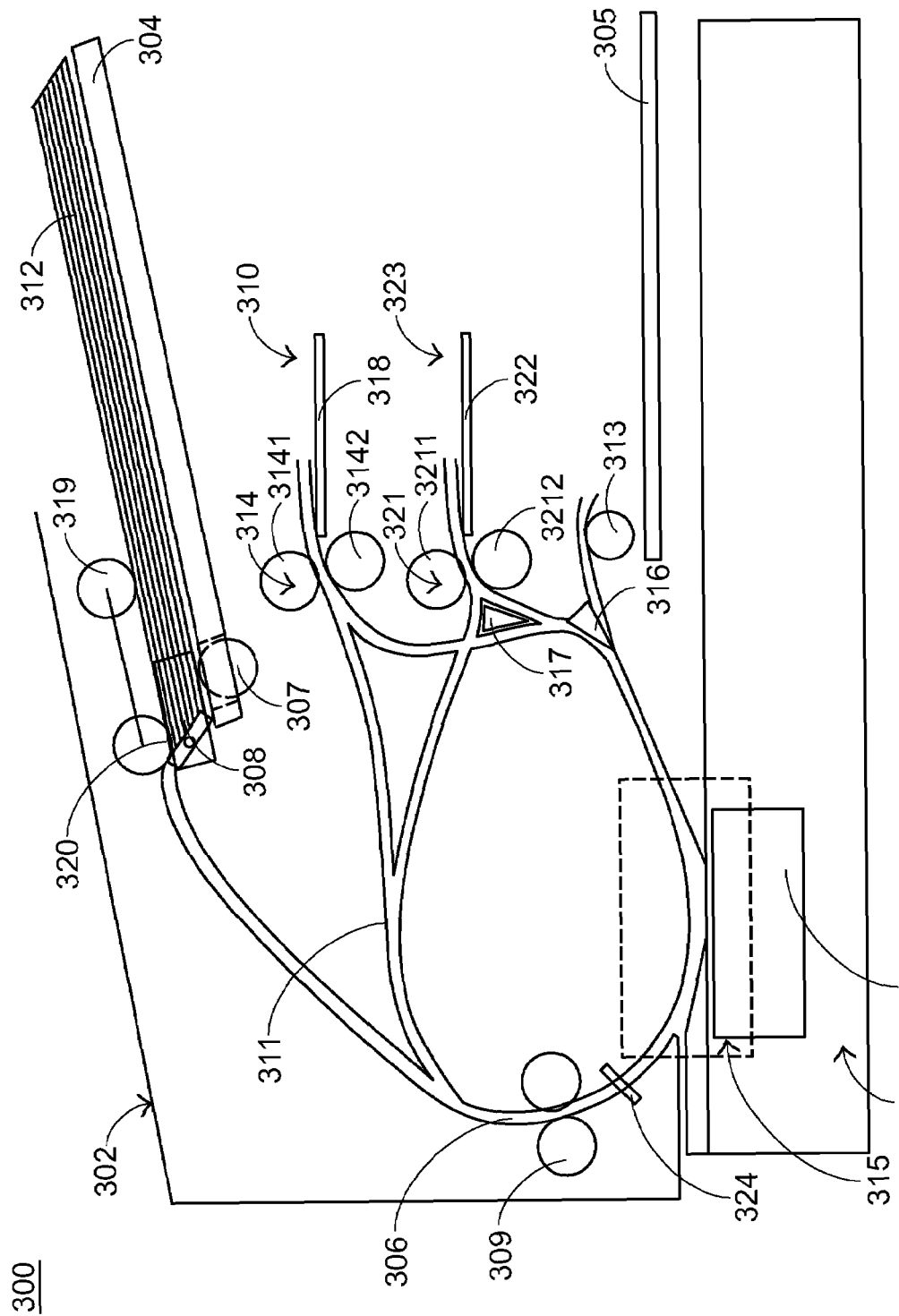
FIG. 4 is a schematic cross-sectional view illustrating a duplex scanning apparatus for performing a single-side scanning operation according to a preferred embodiment of the present invention.

FIG. 4 is a schematic cross-sectional view illustrating a duplex scanning apparatus for performing a single-side scanning operation according to a preferred embodiment of the present invention. The documents 312 to be scanned are placed on the sheet input tray 304, wherein the first sides of the documents 312 face upwardly. By the friction-enhancing stopper adjusting unit 320, the friction-enhancing stopper 308 is changed to have an inclined angle required for performing the single-side scanning operation. As a result, the single-side scanning pick-up arm 319 is in direct contact with the documents 312. In some embodiments, the friction-enhancing stopper adjusting unit 320 has a specific mechanism for rotating the friction-enhancing stopper 308 so as to change the inclined angle of the friction-enhancing stopper 308. Alternatively, the friction-enhancing stopper adjusting unit 320 used for the duplex scanning operation may be replaced with another friction-enhancing stopper adjusting unit 320 exclusively used for the single-side scanning operation.

Hereinafter, the procedure of performing a single-side scanning operation by the duplex scanning apparatus 300 will be illustrated with reference to FIG. 4. First of all, the single-side scanning pick-up arm 319 is cooperated with the friction-enhancing stopper 308 to offer a frictional force required to transport the document 312 into the transfer channel 306. After the selected document 312 is fed into the transfer channel 306, the transfer roller assembly 309 transports the document 312 to the scan region 315. When the document 312 is transported across the scan region 315, the scanning module 303 of the flatbed image scanning portion 301 scans the first side of the document 312. Meanwhile, the first switching element 316 is maintained at a position leading the document 312 toward the sheet ejecting tray 305. After the first side of the document 312 is scanned, the sheet ejecting roller assembly 313 transports the document 312 to the sheet ejecting tray 305, wherein the first side of the document 312 faces downwardly to the sheet ejecting tray 305. The remainder documents 312 on the sheet input tray 304 successively implement the single-side scanning operations as described above for the first document 312. As a consequence, the documents 312 are stacked on the sheet ejecting tray 305 in the same order as the original stack, wherein the first sides of the documents 312 face downwardly.

From the above description, when the duplex scanning apparatus of the present invention performs the duplex scanning operation, the document needs to pass through the scan region for two times and but is inverted for only one time. In addition, the scanned documents are stacked on the sheet ejecting tray in the same order as the original stack. More especially, since two documents are scanned during each scanning cycle, the scanning speed of performing the duplex scanning operation is increased. In comparison with the conventional duplex scanning apparatus, the number of transporting the document across the scan region according to the present invention is identical but the number of inverting the document is smaller by one, so that the scanning time is shortened. In the conventional technology, the duplex scanning operation of the second document is performed after the second side of the first document has been scanned. Whereas, since two documents can be scanned during each scanning cycle, the duplex scanning apparatus of the present invention has an enhanced scanning speed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A duplex scanning apparatus for scanning images of a plurality of documents, said duplex scanning apparatus comprising:

a flatbed image scanning portion including a scanning module for scanning said images of said documents in a scan region; and an automatic document feeder comprising:

a sheet input tray for placing said documents thereon;

a sheet ejecting tray for supporting said documents thereon;

a transfer channel arranged between said sheet input tray and said sheet ejecting tray, wherein a portion of said transfer channel is disposed within the range of said scan region;

a sheet pick-up roller disposed in said sheet input tray for transporting said documents into said transfer channel;

a friction-enhancing stopper sustained against said documents to offer a frictional force required to transport said documents into said transfer channel such that only one of said documents is selected to feed into said transfer channel for each time;

a transfer roller assembly disposed in said transfer channel for transporting said documents through said transfer channel;

a first inverting region disposed between said sheet input tray and said sheet ejecting tray;

a second inverting region disposed between said first inverting region and said sheet ejecting tray;

an inverting channel arranged between said inverting regions and said transfer roller assembly;

a first switching element arranged at the intersection between said transfer channel and said sheet ejecting tray for guiding said documents to said sheet ejecting tray or said inverting regions;

a second switching element arranged at the intersection between said inverting channel and said second inverting region for guiding said documents to said first inverting region or said second inverting region;

a sheet ejecting roller assembly disposed in the vicinity of said sheet ejecting tray for transporting said documents to said sheet ejecting tray;

a first inverting roller assembly disposed in the vicinity of said first inverting region for transporting said documents from said transfer channel to said first inverting region or from said first inverting region to said inverting channel; and a second inverting roller assembly disposed in the vicinity of said second inverting region for transporting said documents from said transfer channel to said second inverting region or from said second inverting region to said inverting channel.

2. The duplex scanning apparatus according to claim 1 wherein said first inverting roller assembly comprises:
a first driving roller rotated in either a positive direction or a reverse direction; and
a first follower roller.

3. The duplex scanning apparatus according to claim 1 wherein said second inverting roller assembly comprises:
a second driving roller rotated in either a positive direction or a reverse direction; and
a second follower roller.

4. The duplex scanning apparatus according to claim 1 wherein said first inverting region includes a first thin plate for supporting said documents which are exited to said first inverting region.

5. The duplex scanning apparatus according to claim 1 wherein said second inverting region includes a second thin plate for supporting said documents which are exited to said second inverting region.

6. The duplex scanning apparatus according to claim 1 further comprising a sensor, which is arranged between said transfer roller assembly and said scan region and electrically connected to said first switching element and said second switching element, for detecting locations of said documents and controlling said first switching element and said second switching element according said locations of said documents.

7. A duplex scanning method for scanning a plurality of documents by a duplex scanning apparatus, said documents being sustained against a sheet pick-up roller, said method comprising steps of:
feeding a first document of said documents which is in direct contact with said sheet pick-up roller into a transfer channel;
scanning a second side of said first document when said first document is transported across a scan region;
feeding a second document of said documents which is in direct contact with said sheet pick-up roller into said transfer channel when a tail edge of said first document passes through a sensor;
feeding said first document into a first inverting region;
scanning a second side of said second document when said second document is transported across said scan region;
feeding said first document into an inverting channel when a tail edge of said second document passes through said sensor;
feeding said second document into a second inverting region;
scanning a first side of said first document when said first document is transported across said scan region;
ejecting said first document into a sheet ejecting tray;
feeding said second document into said scan region and scanning a first side of said second document when said second document is transported across said scan region; and
ejecting said first document into said sheet ejecting tray.

8. The duplex scanning method according to claim 7 wherein said first inverting roller assembly comprises:
a first driving roller rotated in either a positive direction or a reverse direction; and
a first follower roller.

9. The duplex scanning method according to claim 7 wherein said second inverting roller assembly comprises:
a second driving roller rotated in either a positive direction or a reverse direction; and
a second follower roller.

10. The duplex scanning method according to claim 7 wherein said first inverting region includes a first thin plate for supporting said documents which are exited to said first inverting region.

11. The duplex scanning method according to claim 7 wherein said second inverting region includes a second thin plate for supporting said documents which are exited to said second inverting region.

* * * * *